United States Patent [19]

de Seroux et al.

[11] Patent Number: 5,139,733
[45] Date of Patent: Aug. 18, 1992

[54] TRANSFER CUPBOARD FOR A FUEL ASSEMBLY EXTRACTED FROM THE CORE OF A NUCLEAR REACTOR AND COOLED BY AN INTEGRATED GAS CIRCUIT

[75] Inventors: Nicolas de Seroux; Dominique Limouzin, both of Lyons, France

[73] Assignee: Framatome, Courbevoie, France

[21] Appl. No.: 676,078

[22] Filed: Mar. 27, 1991

[30] Foreign Application Priority Data

Mar. 27, 1990 [FR] France ................ 90 03906

[51] Int. Cl.$^5$ ............................................. G21C 19/32
[52] U.S. Cl. .................................... 376/272; 376/268
[58] Field of Search .................. 376/271, 268, 272; 976/DIG. 259, DIG. 263, DIG. 272

[56] References Cited

U.S. PATENT DOCUMENTS 3,629,062 12/1971 Muenchow .......................... 376/271
4,737,336 4/1988 Jones et al. ......................... 376/272

FOREIGN PATENT DOCUMENTS 2726042 8/1977 Fed. Rep. of Germany .
2445589 12/1978 France .

OTHER PUBLICATIONS

Althaus and Brahy; Refueling System Fabrication and Testing; Nuclear Technology; Sep. 1987 No. 3, pp. 287–289.

Primary Examiner—Brooks H. Hunt
Assistant Examiner—Frederick H. Voss
Attorney, Agent, or Firm—Pollock, Vande Sande & Priddy

[57] ABSTRACT

The transfer cupboard (1) comprises a solid body (2) made of a radiation-absorbing material, in which is provided an axially directed receptacle (3) for receiving the assembly (4). The cupboard (1) comprises at least one circuit (15) for cooling the assembly (4) by gas and integrated in the body (2) of the cupboard (1). The cooling circuit comprises at least one main axially directed gas-circulating channel (16) formed in the body (2) of the cupboard, at least one device (18) for the circulation of gas in the cooling circuit (15), and at least one device (17) for purifying the circulating gas, which are arranged in the vicinity of one end of the main channel (16). Two secondary channels (20, 21) formed in the body (2) of the cupboard make it possible to connect each of the ends of the main channel (16) to a corresponding end of the receptacle (3) for the fuel assembly (4), by which the cooling circuit is closed again.

10 Claims, 2 Drawing Sheets

TRANSFER CUPBOARD FOR A FUEL ASSEMBLY EXTRACTED FROM THE CORE OF A NUCLEAR REACTOR AND COOLED BY AN INTEGRATED GAS CIRCUIT

FIELD OF THE INVENTION

The invention relates to a transfer cupboard for a fuel assembly extracted from the core of a nuclear reactor, especially of a fast-neutron nuclear reactor cooled by a liquid metal.

BACKGROUND OF THE INVENTION

Fast-neutron nuclear reactors cooled by a liquid metal, such as sodium, comprise a core consisting of prism-shaped, elongate assemblies submerged in liquid sodium contained in the reactor vessel.

It may be necessary to extract fuel assemblies from the core of the reactor within the vessel, for example in order to replace spent or defective assemblies by new assemblies. The assemblies which are removed from the reactor vessel are in an irradiated state and generate radioactive radiation. Furthermore, these assemblies have residual activity and give rise to thermal emission caused by nuclear reactions in the irradiated fuel. Finally, these assemblies, at the moment when they are removed from the vessel, retain some liquid sodium.

The fuel assemblies removed from the vessel of the nuclear reactor therefore have to be arranged in containers ensuring the biological protection of the environment in which the assemblies are moved or temporarily stored. It is also necessary to cool the assembly during its transfer.

To carry out the transfer and temporary storage of the fuel assemblies of fast-neutron nuclear reactors, it is customary to use cupboards comprising a solid body made of a material absorbing nuclear radiation, in which is provided a receptacle for a fuel assembly exposed or immersed in a casing filled with sodium to ensure its cooling. Fuel assemblies for fast-neutron reactors are prism-shaped and are of great length in relation to their transverse dimensions. The body of the cupboard therefore has an elongate shape and the receptacle of the fuel assembly is arranged in the solid body, in a central position and in a substantially axial direction.

The receptacle opens out at one of the ends of the cupboard body via a sealingly closable orifice, so as to make it possible to introduce the assembly into the cupboard and extract it. These operations are conducted by means of a lifting assembly comprising winches, associated with the cupboard: in general, the device for closing the cupboard is connected to a corresponding device associated, for example, with a passage well for the assemblies.

To ensure that the assembly is cooled during its transfer, an assembly of circuits and of appliances making it possible to circulate a neutral cooling gas in contact with the fuel assembly arranged in the cupboard receptacle and to cool and purify this circulating gas is used.

The assembly of circuits and of appliances necessary for these operations, comprising particularly blowers, heat exchangers and gas purifiers, for example cyclone separators, is installed outside the cupboard, with the result that the total volume of the installation is large and that this installation does not afford all the necessary safety guarantees; for example, atmospheric oxygen is liable to mix with the cooling gas if one of the circuits or appliances outside the cupboard has a leak.

Moreover, radioactive fluids are made to circulate on the outside of the body of the cupboard ensuring biological protection.

SUMMARY OF THE INVENTION

The object of the invention is, therefore, to provide a transfer cupboard for a fuel assembly extracted from the core of a nuclear reactor, particularly of a fast-neutron nuclear reactor cooled by a liquid metal, comprising a solid body of elongate shape made of radiation-absorbing material, in which is provided an axially directed receptacle for the assembly, opening out at one of the axial ends of the cupboard body via a sealingly closable orifice, and a lifting means for displacing the assembly in the axial direction in relation to the body of the cupboard, this transfer cupboard making it possible to cool the assembly by gas circulation under very good safety conditions, without the use of a bulky installation located outside the cupboard body.

To this end, the cupboard according to the invention comprises at least one circuit for cooling the assembly by gas, integrated in the body of the cupboard and comprising at least one main substantially axially directed gas-circulation channel formed in the body of the cupboard over a substantial part of its length, at least one device for purifying the circulating gas, and a means for the circulation of the gas, which are arranged in the vicinity of one end of the main channel, and two secondary channels connecting each of the ends of the main channel to a corresponding end of the receptacle for the fuel assembly, by means of which the cooling circuit is closed again.

BRIEF DESCRIPTION OF THE DRAWINGS

To facilitate understanding of the invention, an embodiment of a transfer cupboard according to the invention will now be described by way of example, with reference to the accompanying drawings.

DESCRIPTION OF PREFERRED EMBODIMENT

Figure 1:
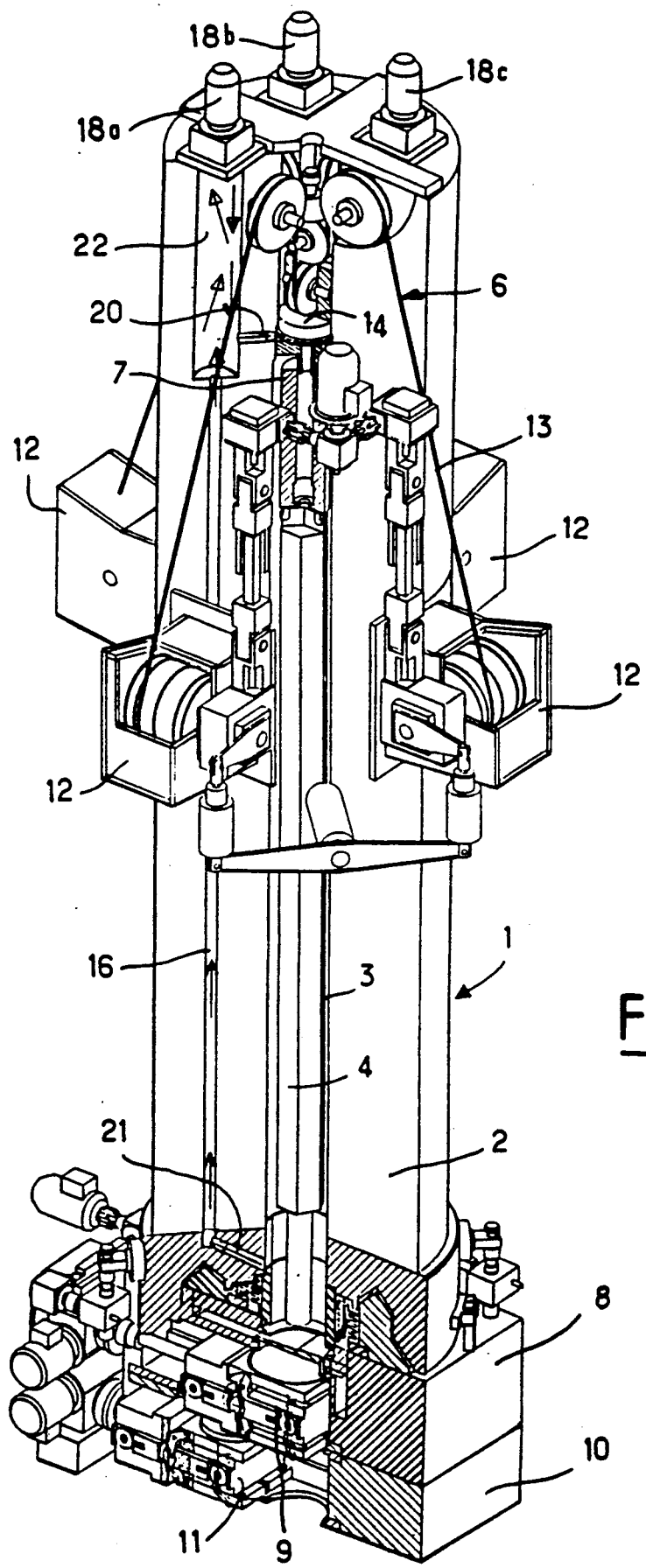
FIG. 1 is a general exploded and partially sectional perspective view of a transfer cupboard according to the invention.

FIG. 1 illustrates a transfer cupboard for a fuel assembly of a nuclear reactor 1. The cupboard 1 is constituted by a cylindrical body 2 comprising, in its central part and along its axis, a bore 3 passing through the body over its entire length. The cupboard body consists of a solid steel piece of great thickness in the radial direction and of great length.

As regards a fuel assembly for a fast-neutron reactor, greater than 4 m in length and with a hexagonal cross-section, the side of which has a length of 125 mm, the body 2 of the cupboard possesses an outside diameter of 1.30 m, a central bore 0.30 m in diameter an a length of the order of 6 m. The cupboard body therefore has a wall thickness of 0.50 m; its total mass is about 55 tons.

In FIG. 1, the fuel assembly 4 is shown in its transport position within a central receptacle 3 of the cupboard body.

The assembly 4 occupies only some of the length of the receptacle 3; in the upper part of the receptacle 3 is arranged the grab 7 of the lifting device 6 for the assembly.

The lower part of the body 2 is connected to the support 8 of a motorized cupboard valve 9 making it possible to effect the opening or sealing closure of the end of the bore 3 in its lower part opening out at the end of the body 2.

The support 8 of the cupboard valve 9 is adapted to be connected to the support 10 of a well valve 11 making it possible to effect the opening or sealing closure of a passage well, for example a passage leading through a slab covering the reactor vessel filled with liquid sodium and containing the reactor core.

When the valves 9 and 11 are superposed and open, the fuel assembly 4 can be changed from a position submerged in the liquid sodium to its transfer position within the cupboard 1 by the use of the lifting device 6.

The lifting device 6 comprises four winches 12 arranged at 90° relative to one another about the body 2 of the cupboard. Wound on each of the winches 12 is one end of a cable 13 which, by means of return and lifting pulleys accommodated in the upper part of the body of the cupboard 1, makes it possible to obtain the displacement of the grab 7 which has fingers for catching the assembly 4 on the inside of the bore 3 and in its axial extension. Order to ensure its introduction into or order to ensure its introduction into the cupboard or, on its extraction from the cupboard.

The grab 7 comprises a hollow part of cylindrical shape carrying the fingers for catching the assembly, which is fixed in its upper part to a lifting and guiding assembly 14 carrying the lifting pulleys and pierced radially with channels communicating with the central bore of the grab 7.

When the fuel assembly 4 is in its transfer position within the cupboard 1, as shown in FIG. 1, the assembly 14 is located in the upper part of the bore 3 of the cupboard body, in a specific position in relation to the solid body 2 of the cupboard.

Figure 2:
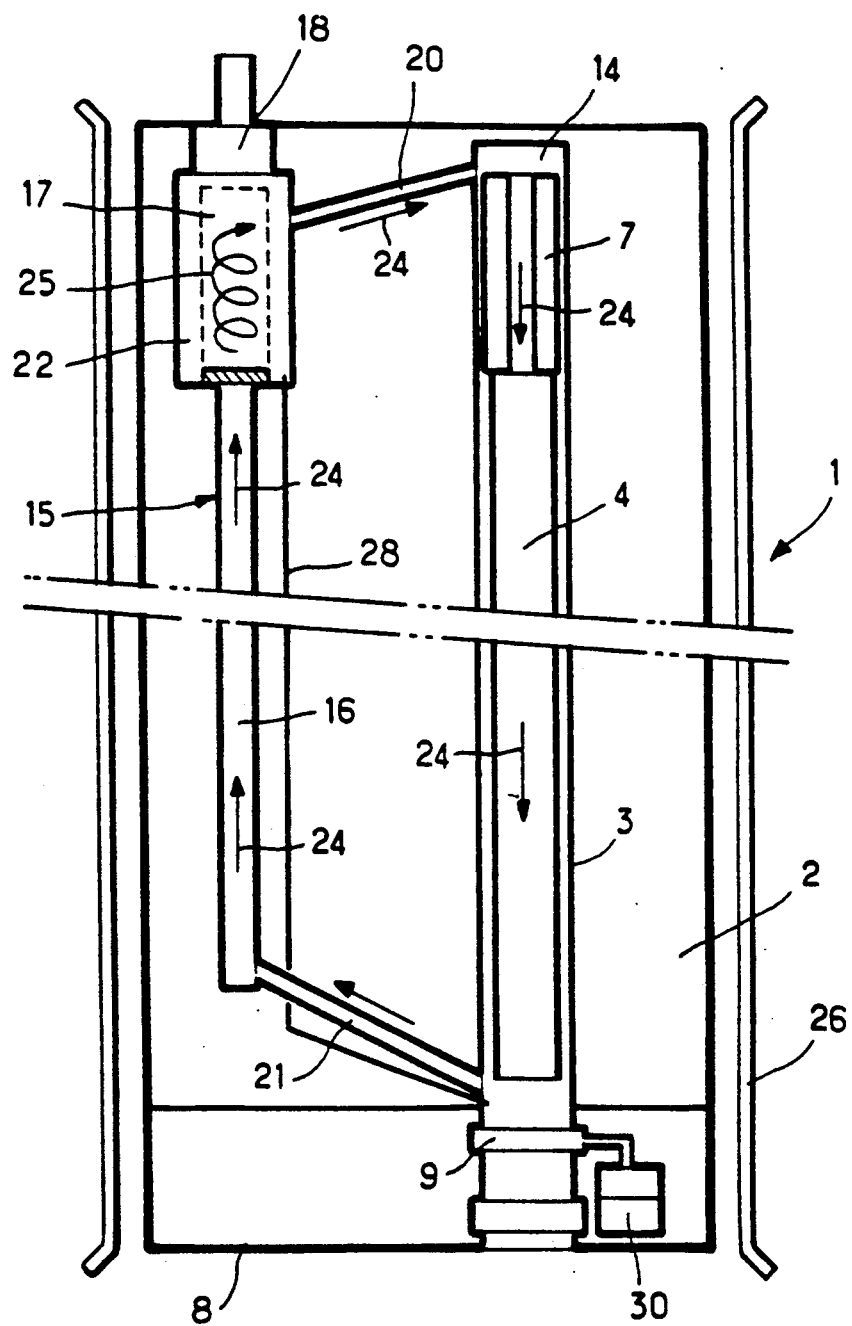
FIG. 2 is a schematic sectional view of a cupboard according to the invention, showing a circuit for the gas cooling of an assembly.

Referring to FIGS. 1 and 2, a circuit 15 for the circulation and purification of the cooling gas for the assembly 4 arranged in the receptacle 3 of the body 2 of the cupboard will now be described.

The cooling circuit 15 comprises a main channel 16 machined in the body 2 of the cupboard, a device 18 for circulating the gas in the circuit, a device 17 for purifying the circulating gas, and two channels 20 and 21 connecting the main channel 16 and the receptacle 3 for the assembly 4, by means of which the circuit 15 is closed again.

The cooling apparatus for the assembly comprises four circuits identical to the circuit 15 and arranged in positions located at 90° relative to one another about the axis of the body 2 and of the receptacle 3 of the cupboard.

The main channel 16 of each of the cooling circuits extends in a substantially axial direction parallel to the axis of the receptacle 3 and of the solid cylindrical body 2 of the cupboard 1, over a substantial part of the axial length of the body 2. The channel 16 has a substantially smaller diameter than receptacle 3. For example, in the present case, the diameter of the main channel 16 is 50 mm.

The upper part of main channel 16 opens into a receptacle 22 which is machined in the body 2 of the cupboard and the diameter of which is substantially larger than the diameter of the channel 16.

The gas purification device 17 consisting of a separator of the cyclone type is arranged in the receptacle 22 in such a way that the upper end of the main channel 16 opening into the receptacle 22 is in communication with the inlet of the separator.

The end of the receptacle 22 opposite the inlet end of the separator 17 is in communication with a blower 18 constituting the means for circulating the cooling gas in the circuit formed within the body of the cupboard.

The blower 18 is in communication via its suction port with the outlet of the cyclone separator 17 and ensures that an inert cooling gas is delivered and blown to the periphery of the receptacle 22 communicating, by way of the upper connecting channel 20, with the upper part of the receptacle 3 for the assembly 4.

As represented schematically by the arrows 24 in FIG. 2, the cooling gas, which may be an inert gas, such as argon, is delivered by the blower 18 into the channel 20 and then, by means of the part 14, into the central bore of the grab 7. The blowing of cooling gas into contact with the assembly 4 and in the longitudinal direction of this assembly is carried out by way of the central bore of the grab 7.

The inert gas, which has circulated in contact with the assembly and over its entire length and which ensures the cooling of the assembly, is returned to the lower part of the main channel 16 by way of the connecting channel 21.

The cooling gas, which has circulated in contact with the assembly which it cools, has heated up, its outlet temperature depending on the energy emitted by the fuel assembly 4 and on the gas flow circulating in the cooling circuit. Furthermore, the cooling gas circulating in contact with the assembly carries with it sodium aerosols and residual sodium droplets which are retained by the prism-shaped envelope and fuel elements or needles of the assembly at the moment when this assembly is extracted from the liquid sodium, when it is being introduced into the cupboard 1.

The cooling gas arriving at the lower part of the main channel 16 is therefore hot and laden with sodium droplets and sodium gas.

The relatively high circulation rate of the gas determined by the blower 18 and the small diameter of the channel 16 generates a turbulent flow of the cooling gas within the channel 16, this circulation occurring in the vertical direction and from the bottom upwards.

As a result of its turbulent flow in the channel 16 over a substantial part of the height of the body 2 of the cupboard, the gas cools very quickly, giving off its heat to the metal mass of the body 2.

The body 2 of the cupboard is surrounded by a tubular screen or thermal shield 26 which ensures the cooling of the cupboard body 2 by thermosiphon, cooling air circulating between the body 2 and shield 26 as a result of the convection currents.

The heat transmitted to the solid body 2 of the cupboard by the cooling gas and by the fuel assembly is therefore eliminated by natural circulation.

The cooled gas carrying sodium aerosols and droplets in suspension arrives at the upper part of the main channel 16 in the receptacle 22 and enters the cyclone separator 17. The cooling gas circulates in the separator 17 in a swirling manner, as indicated schematically by the arrow 25, in such a way that the sodium droplets are separated from the cooling gas and collect in the lower part of the separator, before flowing by gravity into a vertical channel 28 machined inside the body 2 of the cupboard. The upper part of channel 28 opens into the receptacle 22 and the lower part into a sodium collection tank 30 arranged in the support 8 of the valve 9 for closing the receptacle 3 of the cupboard.

The gas sucked up by the blower 18 at the outlet of the separator 17 is therefore a cooled and purified gas which is returned into the receptacle 3 by way of the connecting channel 20, in order to ensure the cooling of the assembly 4.

The device integrated in the body of the cupboard therefore functions in the closed-circuit mode, although a top-up of cooling gas can be ensured by means of an auxiliary argon tank (not shown).

As can be seen in FIG. 1, each of the four cooling circuits of the cupboard comprises a blower, such as 18a, 18b and 18c, fastened to the upper part of the body 2 of the cupboard in the extension of a receptacle 22 and of a channel 16 connected to the central receptacle 3 of the cupboard by way of connecting channels 20 and 21.

Arranged in each of the receptacles 22 is a separator of the cyclone type, such as the separator 17.

The cooled and purified cooling gas delivered into a connecting channel 20 by means of the blower enters a radial channel of the guide piece 14 communicating with the central bore of the hollow grab 7. The guide piece 14 therefore comprises four radial channels arranged at 90° relative to one another in the extension of the four connecting channels 20.

The transfer cupboard according to the invention therefore has the advantage of making it possible to cool a fuel assembly, without the need to use auxiliary means located outside the body of the cupboard.

The assembly is cooled by circulation of gas which is capable of carrying with it impurities, for example sodium aerosols and droplets of liquid metal, such as sodium, retained by the fuel assembly. The purification of the gas is carried out by means integrated in the body of the cupboard, and therefore the cooling device can function in a completely closed circuit.

No part of the cooling circuit or cooling circuits is located outside the cupboard body, in which these circuits are completely integrated. This avoids the risk that oxygen will be introduced into the inert-gas cooling circuit or that a radioactive product will leak outside the cupboard.

The cupboard according to the invention therefore has greater operating safety and a much smaller bulk than the assembly transfer devices according to the prior art.

The cupboard according to the invention can comprise a single cooling circuit or any number of circuits less or more than four.

The purification device associated with each of the cooling circuits can consist of a device other than a cyclone separator. The means for circulating the gas in the cooling circuit can likewise consist of devices other than blowers.

It is also possible to add to each of the cooling circuits devices for cooling the gas circulating inside the main channel, for example devices assisting the heat exchanges between the gas and the cupboard body, such as blades, baffles or other devices for deflecting the circulation of the gas stream. These devices can also perform the function of separating the impurities carried along by the cooling gas.

The means for recovering the liquid metal separated from the cooling gas can be produced in a different manner and be arranged in a part of the cupboard other than one described hereinabove.

Finally, the cupboard according to the invention can be used for the transfer and storage of fuel assemblies, other than assemblies of fast-neutron nuclear reactors cooled by liquid metal.

We claim:

1. Transfer cupboard for a fuel assembly extracted from the core of a nuclear reactor cooled by a liquid metal, said transfer cupboard comprising
    (a) a solid body (2) of elongate shape made of radiation-absorbing material;
    (b) an axially directed receptable (3) for said fuel assembly (4), opening out at an axial end of said body (2) via a sealingly closable orifice;
    (c) at least one lifting means (12) for displacing said fuel assembly (4) in an axial direction in relation to said body (2);
    (d) at least one circuit (15) for cooling said fuel assembly (4) by gas, completely integrated in said body (2) and comprising at least one main substantially axially directed gas-circulation channel (16) formed in said body (2) and arranged over a substantial part of a length of said body;
    (e) at least one means (18) for circulation of gas (18);
    (f) a device (17) for purifying circulating gas disposed adjacent one end of said main channel (16); and
    (g) first and second secondary channels (20, 21) connecting respective ends of said main channel (16) to a corresponding end of said receptacle (3) for said fuel assembly (4), by means of which secondary channels said cooling circuit is closed again.

2. Transfer cupboard according to claim 1, further comprising a capacity (30) for recovering liquid metal carried along by said cooling gas, connected by means of a channel (28) formed in said body (2) to a zone adjacent to the end of said main channel (16) connected to said circulating gas purification device (17).

3. Transfer cupboard according to claim 1, wherein said liquid-metal recovery capacity (30) is arranged at one end of said body (2) within a support (8) in which is fastened a valve (9) for sealing closure of said orifice of said receptacle (3) opening out at said axial end of said body (2).

4. Transfer cupboard according to claim 1, wherein said device (17) for purifying said circulating gas consists of a separator of the cyclone type.

5. Transfer cupboard according to claim 1, wherein said device (17) for purifying said circulating cooling gas is arranged in a receptacle (22) provided in said body (2) and communicating with one end of said main channel (16).

6. Transfer cupboard according to claim 1, wherein said means (18) for circulation of gas in said cooling circuit (15) consists of a blower (18) having an inlet and suction port communicating with an outlet of said gas purification device (17) and a port for delivering and blowing purified cooling gas into a secondary connecting channel (20) connected to said receptacle (3) for said fuel assembly (4), so as to cause said cooling gas to circulate and ensure closed-circuit purification of said cooling gas.

7. Transfer cupboard according to claim 1, wherein said main channel (16) has a diameter sufficiently small to cause said cooling gas in turbulent flow in said main channel (16) to cool in contact with said body (2) in which said main channel (16) is formed.

8. Transfer cupboard according to claim 1, comprising, around said body (2), a tubular casing (26) ensuring that said body (2) is cooled by thermosiphon.

9. Transfer cupboard according to claim 1, wherein said lifting means (12, 13, 14, 7) for said fuel assembly (4) comprises a tubular hollow grab (7) having an inner bore communicating with one of said secondary channels (20) of said cooling circuit when said fuel assembly (4) is in transfer position within said receptacle (3) and is fastened to an end of said grab (7), blowing of cooling gas into contact with said fuel assembly (4) being carried out by means of said hollow grab (7).

10. Transfer cupboard according to claim 1, wherein said body (2) comprises four cooling circuits arranged substantially at 90° relative to one another about an axis of said body (2).

* * * * *